United States Patent
Shimada et al.

(10) Patent No.: US 6,294,890 B1
(45) Date of Patent: Sep. 25, 2001

(54) ROBOT CONTROLLER

(75) Inventors: Akira Shimada; Yoshinobu Ohtachi, both of Chiba; Tsutomu Mita, Kanagawa, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/354,474

(22) Filed: Jul. 15, 1999

(30) Foreign Application Priority Data

Jul. 23, 1998 (JP) ................................................ 10-207820

(51) Int. Cl.⁷ ................................................... G05B 19/25
(52) U.S. Cl. ................. 318/570; 319/568.21; 319/568.22; 319/568.2; 319/567; 319/576; 901/29; 901/42
(58) Field of Search ......................... 318/568.21, 568.22, 318/568.2, 576, 568.11, 567; 901/29, 42

(56) References Cited

U.S. PATENT DOCUMENTS 6,040,554 * 3/2000 Terada et al. ........................... 901/42
6,064,168 * 5/2000 Tao et al. .......................... 318/568.21

* cited by examiner

*Primary Examiner*—Karen Masih
(74) *Attorney, Agent, or Firm*—Adams & Wilks (57) ABSTRACT

A robot controller is provided which can smoothly switch the mode between a position control in a free space and a position or force control to a contact surface, so that even if the contact surface has an unknown geometric error, the control system mode can be switched without the damage of a contact object and a workpiece and the out-of-control of the robot. The workpiece is moved to approach an estimated contact surface within the free space under a position control. Next, a groping motion is carried out under a position control from the estimated contact surface to an actual contact surface, and switched to a contact motion under a force control at the time point when the detected force value exceeds a certain threshold value. Then, a leaving motion is carried out.

4 Claims, 9 Drawing Sheets

Fig. 1 (a) Approach Motion

Fig. 1 (b) Groping Motion

Fig. 1 (c) Contact Motion

| Motion | Condition | Control Type 1 | Control Type 2 | Control Type 3 | Control Type 4 |
|---|---|---|---|---|---|
| Approach Motion | Move to close position | Position/ Position | Position/ Position | Position/ Position | Position/ Position |
| Groping Motion | Move to resisting force equal to set value | Position/ Position | Position/ Resisting Force | Position/ Position | Position/ Resisting Force |
| Contact Motion | Desired operation | Position/ Friction | Position/ Friction | Position/ Resisting Force | Position/ Resisting Force |
| Leaving Motion | Move to leaving position | Position/ Position | Position/ Position | Position/ Position | Position/ Position |

| Control Mode | $\sigma$ | $B_0^{*-1}$ Formula (67) | $\tilde{C}_0$ Formula (70) | $\tilde{r}$ Formula (71),(72) | $y$ | $k_1$ $k_2$ |
|---|---|---|---|---|---|---|
| Position/Position Control | Formula (73A) | $\begin{bmatrix} M_{x0\_11} & M_{x0\_12} \\ M_{x0\_21} & M_{x0\_22} \end{bmatrix}$ | $\begin{bmatrix} a_1^1 & 0 & 1 & 0 \\ 0 & a_1^2 & 0 & 1 \end{bmatrix}$ | $\begin{bmatrix} a_1^1 P_{rx} + \dot{P}_{rx} \\ a_1^2 P_{ry} + \dot{P}_{ry} \end{bmatrix}$ | $\begin{bmatrix} P_x \\ P_y \end{bmatrix}$ | (70) (71) |
| Position/Resisting-Force Control | Formula (73B) | $\begin{bmatrix} \dfrac{M_{x0\_11}}{k} & M_{x0\_12} \\ \dfrac{M_{x0\_21}}{k} & M_{x0\_22} \end{bmatrix}$ | $\begin{bmatrix} a_1^1 k_0 & 0 & k_0 & 0 \\ 0 & a_1^2 & 0 & 1 \end{bmatrix}$ | $\begin{bmatrix} a_1^1 f_m + \dot{f}_{rn} \\ a_1^2 P_{ry} + \dot{P}_{ry} \end{bmatrix}$ | $\begin{bmatrix} f_n \\ P_y \end{bmatrix}$ | (72) (74) Formula |
| Position/Friction Control | Formula (73C) | $\begin{bmatrix} \dfrac{M_{x0\_11}}{\alpha \cdot k} & M_{x0\_12} \\ \dfrac{M_{x0\_21}}{\alpha \cdot k} & M_{x0\_22} \end{bmatrix}$ | $\begin{bmatrix} a_1^1 \alpha_0 k_0 & 0 & \alpha_0 k_0 & 0 \\ 0 & a_1^2 & 0 & 1 \end{bmatrix}$ | $\begin{bmatrix} a_1^1 f_n + \dot{f}_{rn} \\ a_1^2 P_{ry} + \dot{P}_{ry} \end{bmatrix}$ | $\begin{bmatrix} f_t \\ P_y \end{bmatrix}$ | |

ROBOT CONTROLLER

BACKGROUND OF THE INVENTION

1. Field of the Invention

The present invention relates to a robot controller having a control system mode switching function, and in particular to a robot controller which can smoothly switch the mode between a position control in a free space and a position or force control to a contact surface, so that even if the contact surface has an unknown geometric error, the control system mode can be switched without the damage of a contact object and a workpiece and the out-of-control of the robot.

2. Description of the Related Art

As for force control study cases, there are known a hybrid position/force control (M. H. Raibert, John J. Craig: Hybrid Position/Force Control of Manipulators, Journal of Dynamic Systems, Measurement, and Control 102, ASME, pp. 126–133, 1981, hereafter referred to as Document 1), a method of developing it using operating coordinate systems as references (O. Khatib: A Unified Approach for Motion and Force Control of Robot Manipulators: The operational Space Formulation, IEEE Journal of Robotics and Automation, Vol. RA-3, No. 1, 1987, hereafter referred to as Document 2), a mechanical impedance control (N. Hogan: Impedance Control: An Approach to Manipulation: Part 1–3, Journal of Dynamic Systems, Measurement, and Control 107, ASME, 1985, hereafter referred to as Document 3), and so on.

Each of the cases is a pioneer study regarding the robot force control. It is, however, known that those cases may encounter a problem in that a control characteristic extremely deviates from its design specifications or a control system becomes unstable due to variations in elasticity and frictional coefficient of a contact surface defining a restricted space.

Further, the most of the cases are limited to the force control in a normal direction to the contact surface.

Moreover, no sufficient consideration is given to a control system with respect to an uncertain state transition associated with the collision occurring between the free space and the restricted space.

As for a control method for collision processes (Shoji, Inaba, Fukuda, and Hosogai, Stable Control for Robot Manipulator facing collision, Japan Mechanical Association Symposium (Chapter C), Vol. 56–527, pp. 1847–1853, 1990 or the like, hereafter referred to as Document 4), there are known a method in which an optimum approaching speed prior to the contact is preliminarily obtained so as not to cause the large impact force, and a position control is switched over to a force control at the time point when a detected force value succeeding to the contact exceeds a threshold value (Kitagaki and Uchiyama, Optimum Approaching Speed for Manipulator in Ambient Condition, Japan Robot Association Journal Vol. 8-4, pp. 413–420, 1990, hereafter referred to as Document 5, Shimura and Hori, Robust Force Control for Robot Manipulator and Control for Collision Process, Japan Robot Association Journal vol. 11-2, pp. 235–245, 1993, hereafter referred to as Document 6; and Kiyoshi Oishi, Force Control Containing Collision Process Based on H ∞ Speed Controller, Japan Mechanical Association Robo-Mech 95, pp. 358 . 361, 1995, hereafter referred to as Document 7), a method in which a control mode having a large damping characteristic is once inserted at the time of switching (O. Khatib, J. Burdic, Motion and Force Control of Robot Manipulators, IEEE Conference on Robotics and Automation, pp. 1381–1386, 1986, hereafter referred to as Document 8), and so on.

In those controls, only the depressing force in the normal direction is used as an object to be force-controlled, and therefore, the frictional force in a tangential direction can not be dealt with, or otherwise the switching therebetween can not be carried out as desired.

It is essential to the force control study cases (Documents 1, 2 and 3) that the geometric position of the contact surface is completely known, that is, no consideration is given to a contact surface having an uncertain geometric error in these cases. For this reason, if the contact surface has the geometric error, the position control under the contact state may result in unnatural force acting on and damaging the contact object and the workpiece, or otherwise, the force control under the non-contact state may result in the out-of-control of the robot because of attempting to make the depressing force coincident with a target force value.

Further, each of the study cases (Documents 4, 5, 6, 7 and 8) is directed to a control system which is simple and lacks a robust property, or is based on a control system which may be robust but is not reliable in stability as a whole.

SUMMARY OF THE INVENTION

The present invention was made in view of the problems noted above. An object of the present invention is to provide a robot controller having such a function as to smoothly switch the mode between a position control in a free space and a position or force control to a contact surface, so that even if the contact surface has an unknown geometric error, the control system mode can be switched without the damage of a contact object and a workpiece and the out-of-control of the robot.

To achieve the above-described object, according to the present invention, there is provided a robot controller used for a processing work or an assembling work to include approach motion means for preliminary setting an estimated contact surface which is the closest surface where a contact surface defining a restricted space and having a geometric error is expected to exist, and moving a workpiece or a predetermined portion of a processing or assembling machine to approach the estimated contact surface under a position control in the direction of at least two degrees of freedom; groping motion means for moving the workpiece or the predetermined portion of the processing or assembling machine under a position control in the direction of at least two degrees of freedom to approach an actual contact surface from the estimated surface reached through the approach motion means at a preliminarily set approach speed equal to or less than a maximum collision speed; contact motion means for simultaneously carrying out a position control in the direction of at least one degree of freedom and a friction control in the direction of the same degree of freedom with respect to the contact surface reached through the groping motion means; and leaving motion means for moving the workpiece on which a processing or the like has been made through the contact motion means or the predetermined portion of the processing or assembling machine by which the processing or the like has been made through the contact motion means to leave to a predetermine position under a position control in the direction of at least two degrees of freedom.

The robot controller may operate such that the robot holds the workpiece and depresses the workpiece onto the processing machine or the like, or alternatively may operate such that the robot holds the processing machine or the like and depresses the predetermined portion (a grinding surface, a cutting surface or the like) of the processing machine onto the workpiece. An unknown geometric error exists between the workpiece and the predetermined portion of the processing machine, and in general the error can not be recognized by the robot accurately.

Therefore, the closest surface is estimated where the contact surface is expected to exist, and defined as the estimated contact surface. Then, since the side away from the estimated surface to the robot is a free space, the robot can be operated using a general position control system. That is, with the approach motion means, the approach motion is carried out under a position control in the direction of at least two degrees of freedom until the estimate contact surface is reached. The reason why the control is carried out in the direction of at least two degrees of freedom is that a position control in the direction of two degrees of freedom is sufficient for a control on a planar plane, but a three-dimensional control requires the direction of the increased degrees of freedom to be controlled.

Next, with the groping motion means, the workpiece or the predetermined portion of the processing or assembling machine approaches the actual contact surface to the estimated contact surface at an approach speed equal to or less than a preset maximum collision speed while the position control in the direction of at least two degrees of freedom is carried out.

As for the maximum collision speed, a threshold value for the resisting force is set to be smaller than a dangerous resisting force, or an absolute value of a threshold value for the friction is set to be smaller than an absolute value of a dangerous friction, so that the maximum collision speed is obtained on the basis of these values.

Next, with the contact motion means, the position control in the direction of at least one degree of freedom and the friction control in the direction of the same degree of freedom are simultaneously carried out with respect to the contact surface reaching by the groping motion means.

The reason why the friction control is carried out is that it is preferable to control the frictional force so that a grinding energy required for the grinding or the like of the workpiece becomes a predetermined designation value in order that a ground surface or the like has high quality (as set forth in Japanese Patent Application No. Hei. 9-124932).

Next, with the leaving motion means, the workpiece on which the processing or the like has been made or the predetermined portion of the processing or assembling machine by which the processing or the like has been made is moved to a predetermined position while the position control in the direction of at least two degree of freedom is carried out. The leaving from the contact surface is executed by switching the control into the position control in the direction of at least two degrees of freedom at the time point when the resisting force in a normal direction becomes zero or a set value approximate zero.

With the above-mentioned arrangement, it is possible to smoothly switch the control mode by the robot between the position control within the free space and the force or position control to the contact surface. Further, even if the contact surface has an unknown geometric error, the mode switching is enabled without the damage of the contact object and the workpiece and the out-of-control of the robot.

Here, although the switching from the groping motion means to the contact motion means may be carried out forcibly when a predetermined time period has been passed or a target position has been reached, according to the present invention it is preferable that the groping motion means carries out a position control in the direction of at least one degree of freedom from the estimated contact surface reaching by the approach motion means to the actual contact surface, carries out a resisting-force control in the direction of another degree of freedom with respect to the contact surface, and transits to the contact motion means when a detected resisting force or frictional force is equal to or more than a preliminarily set threshold value.

The resisting-force control is carried out with respect to the contact surface, and if the detected force value such as the resisting-force, and the frictional force becomes equal to or larger than the preset threshold value, then the switching is carried out from the groping motion means to the contact motion means.

This can make the mode switching more smoothly.

In addition, since the robot ensures a predetermined cycle time periodically, the time omitted due to the mode switching may be supplemented by the leaving motion means.

Further, according to the present invention, the contact motion means simultaneously carries out a position control in the direction of at least one degree of freedom with respect to the contact surface reaching by the groping motion means, and a control of a resisting force belonging to the direction of another degree of freedom with respect to the contact surface.

The position control and the resisting-force control are carried out in the direction of different degrees of freedom from each other.

Moreover, according to the present invention, the robot controller has a sliding mode decoupling function designed correspondingly to variations in elasticity or friction coefficient of a contact object, and control modes for the position control in the direction of two degree of freedom, the position control in the direction of one degree of freedom and the friction control in the direction of the same degree of freedom, the position control in the direction of one degree of freedom and the control of the resisting force belonging to the direction of another degree of freedom with respect to the contact surface are respectively provided with control elements or compensators preliminarily designed for the respective modes, so that the control elements or the compensators are selectable in association with switching from one to another among the approach motion means, the groping motion means, the contact motion means and the leaving motion means.

The sliding mode decoupling control enables a robust force control against parameter variations. This sliding mode decoupling control is applied to the robot control, and the control elements or compensators preliminarily designed for the respective control modes mentioned above are prepared. The control elements or the compensators are selectable in association with the switching among the approach motion means, the groping motion means, the contact motion means and the leaving motion means.

This enables the sliding mode decoupling control suitable for each motion means, and thus the processing or assembling can be executed with high quality.

DETAILED DESCRIPTION OF THE PREFERRED EMBODIMENTS

A first embodiment of the present invention will be described hereafter with reference to the accompanying drawings. FIG. 1 shows states in which a workpiece 3 held by a robot manipulator 1 approaches a restricted space from a free space to contact with a contact surface 5. In a case where the contact surface 5 is a rotative grindstone or a grinding belt used for a grinding process, or a buff, the contact surface 5 continuously moves downwardly at a speed $V_t$ from the upper side in the figure. Therefore, the workpiece 3 contacting therewith receives a friction in association with the contact.

Here, it is assumed that the contact surface 5 has an uncertain geometric error so that the robot manipulator 1 cannot recognize the accurate position. In this case, the closest surface where the contact surface is expected to exist is estimated, and defined as an estimated-contact surface or an estimated surface 7. The left side of the estimated surface is a free space in the figure, and therefore the robot manipulator 1 can be operated using a general position control system. This control is referred to as a position/position control since the position control is carried out with respect to plural degrees of freedom to control each degree of freedom.

Figure 1A:
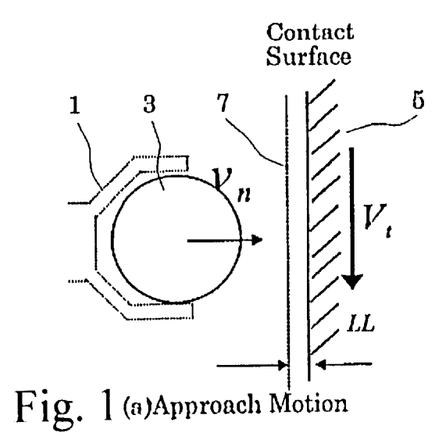
FIG. 1 shows states in which a workpiece held by a robot manipulator approaches a restricted space from a free space to contact with a contact surface.
Figure 1B:
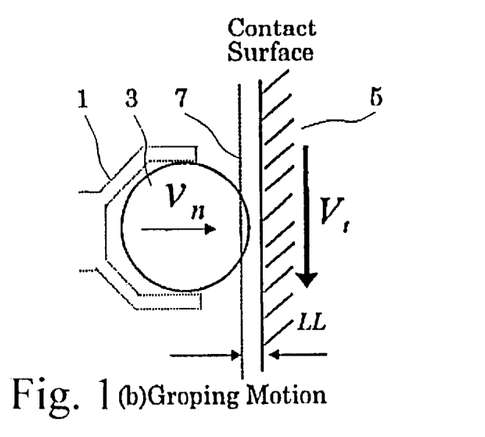
Figure 1C:
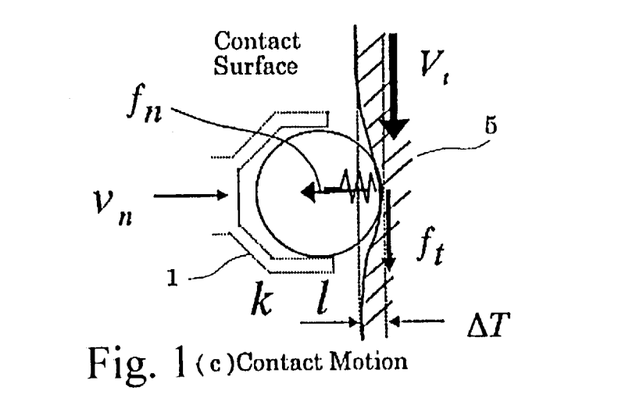

Here, the operation under the position/position control to the estimated surface 7 within the free space is referred to as an approach motion (FIG. 1(a)). Subsequently, a groping motion under a position/resisting-force control is carried out from the estimated surface 7 to an actual contact surface 5 (FIG. 1(b)), and is switched over to a contact motion under position/friction control at the time point when a detected force value exceeds a certain threshold value (FIG. 1(c)).

More specifically, a normal direction speed $V_{na}$ of the contact surface 5 during the approach motion is made coincident with a preset approach speed $V_{ng}$ (for instance, zero) on the estimated surface 7, and the speed $V_{ng}$ is kept constant until a normal direction resisting-force $f_n$ after the collision exceeds a threshold value $f_{nth}$ as preset small or until a tangential direction frictional force $f_{th}$ exceeds a preset small threshold value $f_{tth}$ as also present small. Then, at the time point of exceeding either one of the threshold values, the control is switched over to the position/friction control. When the workpiece 3 leaves from the contact surface 5, the control is switched over to the position/position control to carry out a leaving motion at the time point when the normal direction force reaches zero or a preset value approximate zero.

For the second or subsequent contacts, the estimated surface 7 is set at the position where the preceding leaving motion was initiated. This can cope with the positional variations of the contact surface in association with frictional wear or the like, and can dispense with the groping motion because the estimated surface 7 is coincident with the actual contact surface 5.

Figure 2:
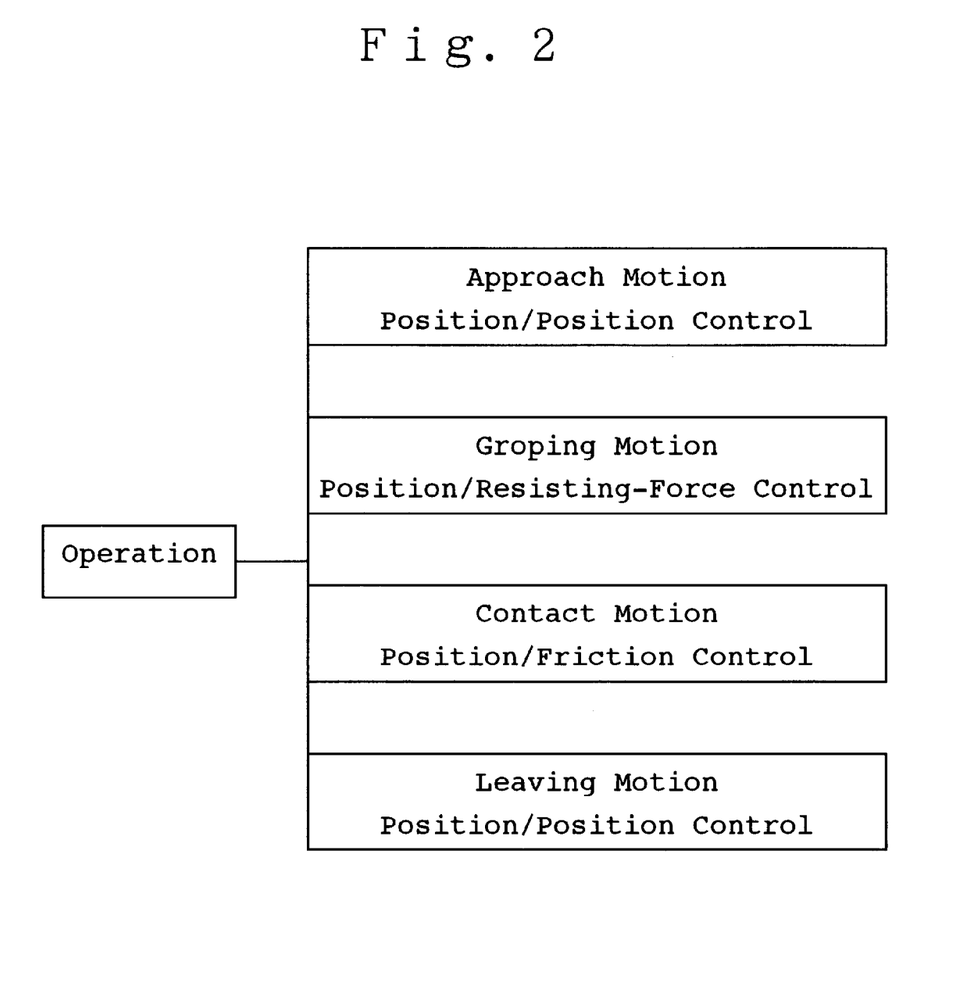
FIG. 2 shows a flowchart for an operation in a first embodiment of the present invention.

FIG. 2 is a flowchart showing each motion for the operation according to the first embodiment of the present invention.

Next, a second embodiment of the present invention will be described.

In the second embodiment of the present invention, the position/position control is carried out from the estimated surface 7 to the actual contact surface 5 with respect to the groping motion. Then, the control is switched over to the position/resisting-force control when a predetermined position has been reached or a predetermined time period has passed (not shown in the drawings).

Figure 3:
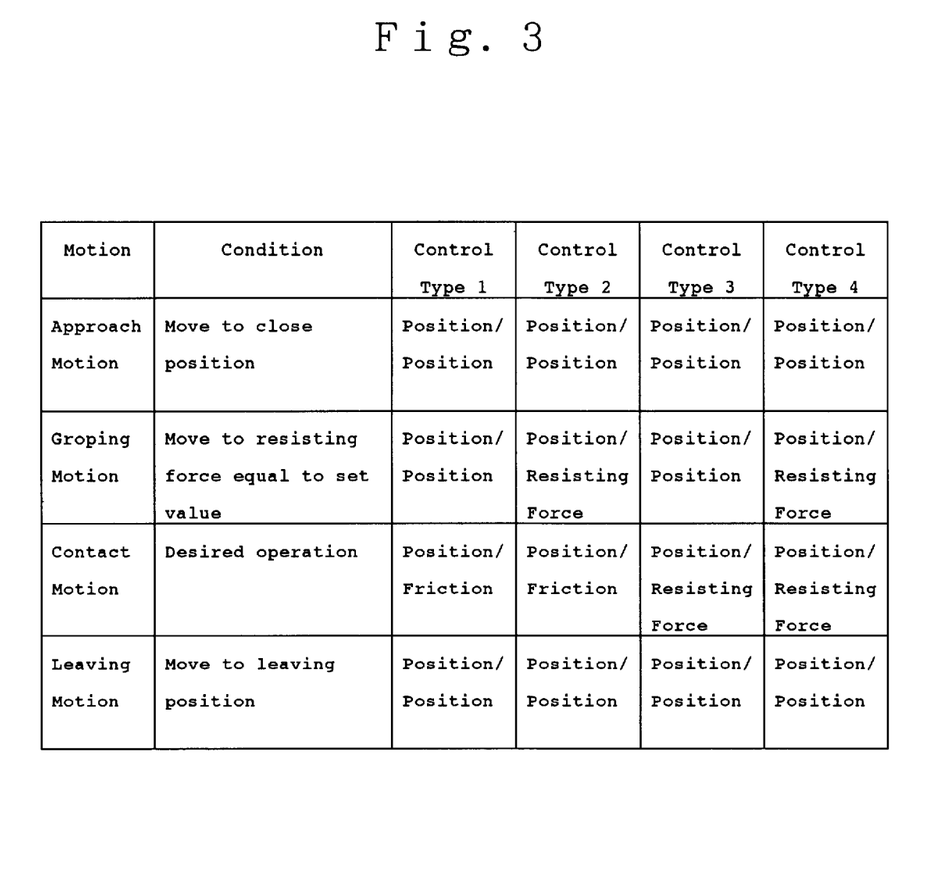
FIG. 3 shows control types corresponding to transitions in each control modes.

Note that the types of control to cope with transition between control modes should not be limited to the above-mentioned first and second embodiments of the present invention. Examples of the control types are shown in FIG. 3. A user can select the control type depending on the intended object or the required operation.

Here, the meanings of the described control modes will be defined as follows: The position/position control means that the position control is carried out in both the normal and tangential directions with respect to the contact surface 5. The position/resisting-force control means that the position control in the tangential direction and the resisting-force control in the normal direction are simultaneously carried out. The position/friction control means that the position control in the tangential direction and the friction control in the tangential direction are simultaneously carried out.

Next, a setting method for the groping motion will be described with respect to each control mode.

First of all, the case where the groping motion is carried out under the position/position control will be described.

In general, when the robust position control or speed control is in operation, the robot 1 must try to continuously follow a target locus or its time variation ratio, the speed $V_{ng}$, even if the workpiece 3 collides against the contact surface 5.

In this case, the threshold value $f_{nth}$ for the resisting force $f_n$ is set to be smaller than a dangerous resisting force $f_{nmax}$, or the absolute value of the threshold value $f_{tth}$ for the frictional force $f_t$ is set to be smaller than the absolute value of a dangerous friction $f_{tmax}$, so that a maximum collision speed $V_{ng,max}$ is obtained on the basis of these values. The following formulae 1 and 2 stand where $\Delta T$ is a measurable time period after the contact, l is a displacement occurring due to the normal direction depressing force at that time, k is an elastic coefficient of the contact surface, and $\alpha$ is a frictional coefficient thereof.

$$f_n|_{\Delta T}=k \cdot l=k \cdot v_n \cdot \Delta T \leq f_{nth} \quad \text{(Formula 1)}$$

$$f_t|_{\Delta T}=\alpha \cdot k \cdot l=\alpha \cdot k \cdot v_n \cdot \Delta T \leq f_{tth} \quad \text{(Formula 2)}$$

If the time period $\Delta T$ is a measurable minimal time period $\Delta T_{min}$, then the maximum collision speed $V_{ng,max}$ can be obtained by the following formula 3.

$$V_{ng,max} \leq \min(f_{nth}/(k_0 \Delta T_{min}), f_{tth}/(\alpha_0 k_0 \Delta T_{min})) \quad \text{(Formula 3)}$$

Therefore, the approach speed $V_{ng}$ is selected so as to satisfy $V_{ng} \leq V_{ng,max}$.

Next, the case where the groping motion is carried out under the position/resisting-force control will be described.

This is not the case where forcible operation is carried out under the position control or the speed control as described in connection with the position/position control. This is the case where the resisting-force control is carried out in the normal direction. It is also conceivable to adopt a process in which the control system automatically generates the drive force based on an error between the target resisting force and the detected force until the actual contact surface 5 is reached. In this case also, the resisting force $f_n$ is monitored, and if the monitored resisting force $f_n$ reaches the threshold value $f_{nth}$, then the operation is switched over to the contact motion.

Next, a method for generating a reference value upon the consideration of the state transition will be described.

Figure 4:
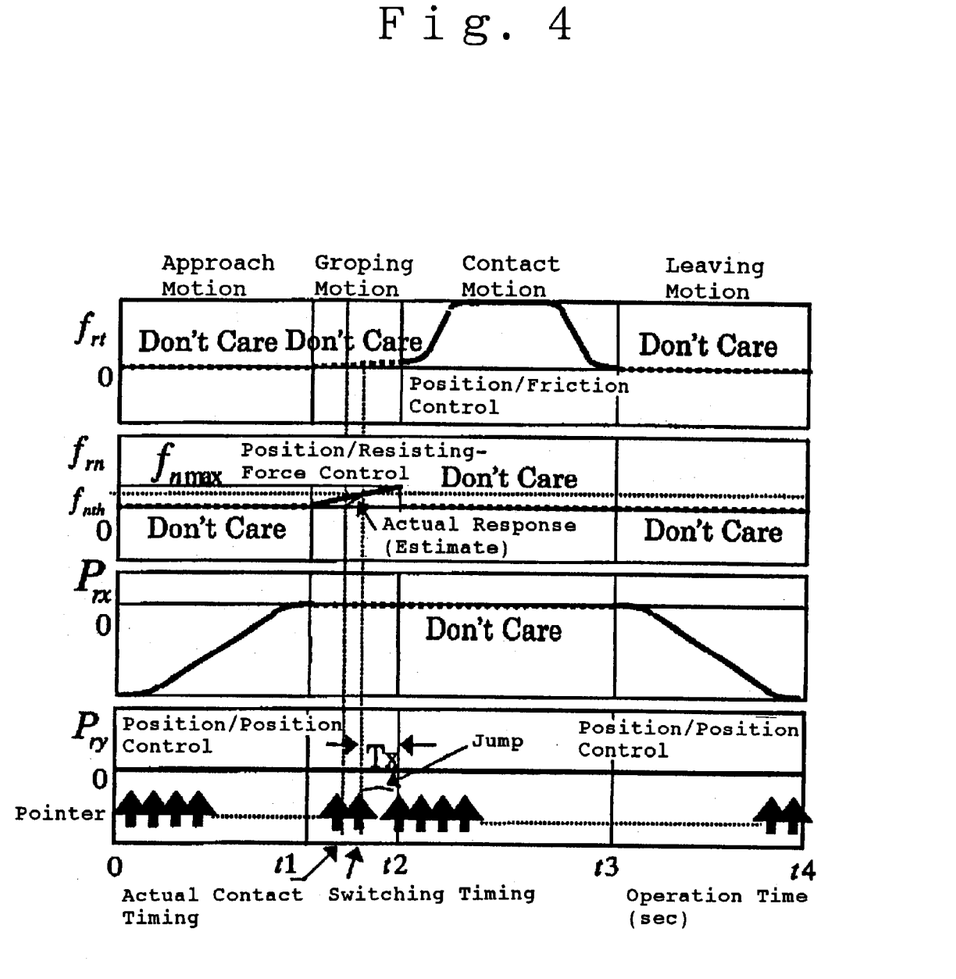
FIG. 4 shows reference values and pointers regarding the mode switching.

FIG. 4 shows an example of the generation of the reference value in the case where the groping motion and the contact motion are carried out under the position/resisting-force control and the position/friction control, respectively, similarly to the first embodiment of the present invention. In this embodiment, physical amounts to be controlled are a normal directional position $P_n$ and the tangential directional position $P_t$ during the approach motion. Therefore, reference values $P_{rn}$ and $P_{rt}$ are generated corresponding to these amounts, respectively. At this stage, each of the resisting-force $f_n$ and the frictional force $f_t$ must be zero, and is never entered into the control system, so that each of reference values $f_{rn}$ and $f_{rt}$ may be any arbitrary value. Accordingly, each of them is set to be zero temporally.

For the groping motion, a position reference value $P_{rt}$ and a resisting-force reference value $f_{rn}$ in the tangential direction are only designed, and other values $P_{rn}$ and $f_{rt}$ are considered as "Don't Care". Similarly, for the contact motion, a position reference value $P_{rt}$ in the tangential direction and a frictional force reference value $f_{rt}$ are defined. For the leaving motion, the values $P_{rn}$ and $P_{rt}$ are defined, whereas other values are considered as "Don't Care", similarly to the approach motion. Note that the switching from the groping motion to the contact motion requires the mode switching occurring due to the interruption generated by the above-mentioned threshold value. At this time, the elements, which must be switched specifically, are all reference values ($P_{rn}$, $P_{rt}$, $f_{rn}$ and $f_{rt}$), a switch for determining which reference value should be used, a control variable for the control system (described later), the following formula 4, and an output value y to be selected for use from output variables ($P_n$, $P_t$, $f_n$ and $f_t$).

$$\sigma, B_0^{*-1}, \tilde{C}_0, \tilde{r}, k_1, k_2 \quad \text{(Formula 4)}$$

Figure 5:
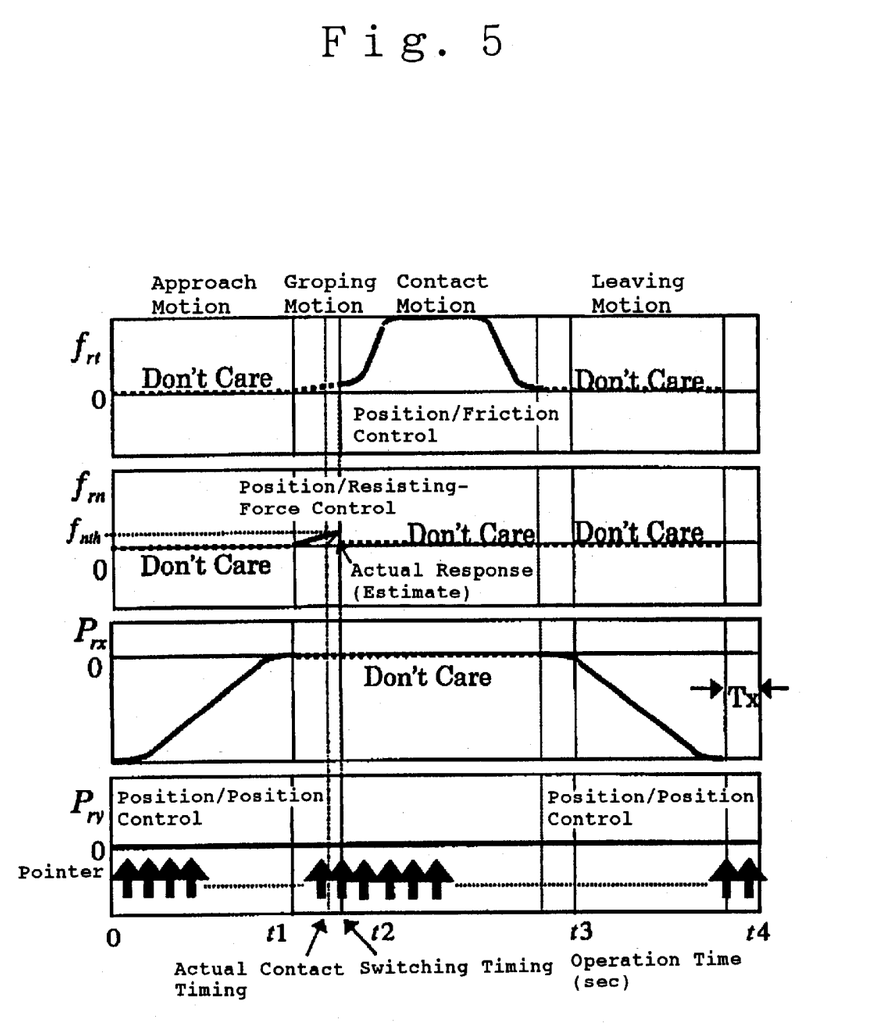
FIG. 5 shows correction for the reference values regarding the mode switching.

Bolded arrows aligned in a lower portion of FIG. 4 correspond to pointers on a memory for generating reference value data, a time period between adjacent pointers is referred to as a motion rate $\Delta T$. The switching from the groping motion to the contact motion requires a jumping of the pointer corresponding to the interruption as shown in this drawings. FIG. 5 shows a corrected reference value immediately after the jumping. Data are added to supplement the jumping time period $T_x$.

Next, a modeling of the manipulator and the external force will be described.

An equation of motion in a joint coordinate system of an n-axis manipulator 1 can be expressed by the following formula 5.

$$M(q)\ddot{q} + h(q,\dot{q}) + J_x^T F = \tau \quad \text{(Formula 5)}$$

Note that $M(q)$ (n×n) is an inertial matrix, q(n×1) is a joint angle, the following formula 6 expresses a non-linear torque generated by a viscous friction, a centrifugal force, a Coriolis force, and a gravity, $J_r$ (n×n) is Jacobian relating the operation coordinate system to the joint coordinate system, F (n×1) is a force received from the friction surface, and τ (n×1) is a driving torque on the joint.

$$h(q,\dot{q})(n \times 1) \quad \text{(Formula 6)}$$

The position of the workpiece 3 on the operation coordinate system is expressed as a function of the joint q by the following formula 7.

$$P = f(q) \quad \text{(Formula 7)}$$

From the formula 7, formulae 8 and 9 are obtained through time-differential on both sides.

$$\dot{P} = J_r(q) \cdot \dot{q} \quad \text{(Formula 8)}$$

$$\ddot{P} = J_r(q) \cdot \ddot{q} + \dot{J}_r(q) \cdot \dot{q} \quad \text{(Formula 9)}$$

Using the formula 9 under the condition of $\det[J_r(q)] \neq 0$, the formula 5 is converted into an equation of motion, formula 10 on the operation coordinate system.

$$M_x(q)\ddot{P} + h_x(q,\dot{q}) + F = J_r^{-T}\tau = \bar{u}$$

$$M_x(q) = J_r^{-T}(q)M(q)J_r^{-1}(q),$$

$$h_x(q,\dot{q}) = J_r^{-T}(q)h(q,\dot{q}) - M_x(q)\dot{J}(q)\dot{q} \quad \text{(Formula 10)}$$

During the force control, the manipulator control system receives a reaction vector F(t) from the contact object. Although the reaction vector F(t) is comprised of a resisting-force component $f_n(t)$ and a friction component $f_t(t)$ on the contact surface 5, either of the components is to be controlled. It is assumed that the resisting force $f_n(t)$ is caused due to the elasticity of the contact surface 5, and the friction $f_t(t)$ in the tangential direction is obtained by multiplying the resisting force by the frictional coefficient α. Using a coefficient matrix K (n×n) and a space matrix $S_M$ (n×n), the vector F(t) is defined as being expressed by the following formula 11, where $K_0$ and $\Delta K$ are a nominal component and a variable component, respectively.

$$F = S_M \cdot K \cdot P = S_M \cdot (K_0 + \Delta K) \cdot P$$

$$S_M = \begin{cases} O_n \dots \text{free space} \\ I_n \dots \text{restricted space} \end{cases} \quad \text{(Formula 11)}$$

Each element of K(n×n) has a construction corresponding to the physical restriction, and this is related to a controllability as described later. Here, a nominal value and a variation are considered as expressed by the formula 12 with respect to the inertial matrix $M_x$ and the non-linear force $h_x$.

$$M_x = M_{x0} + \Delta M_x$$

$$h_x = h_{x0} + \Delta h_x \quad \text{(Formula 12)}$$

Then, the motion equation formula 10 can be expressed by the formula 13.

$$M_{x0} + \Delta M_x)\ddot{P} + (h_{x0} + \Delta h_x) + S_M(K_0 + \Delta K)P = M_{x0}\ddot{P} + \Delta h + S_M K_0 P - d = \bar{u} - d = \Delta M_x\ddot{P} + \Delta h_x + S_M \Delta KP, \|d\| < L \quad \text{(Formula 13)}$$

Here, if the input is artificially determined as being expressed by the formula 14, then the motion equation can be further simplified approximately so that a corresponding equation of state, formula 16, is obtained.

$$\bar{u} = u + h_{x0} \quad \text{(Formula 14)}$$

$$M_{xO}\ddot{P}+S_M K_O P=u+d \quad \text{(Formula 15)}$$

$$\begin{bmatrix} \dot{P} \\ \ddot{P} \end{bmatrix} = \begin{bmatrix} 0 & I \\ -M_{XO}^{-1}S_M K_0 & 0 \end{bmatrix}\begin{bmatrix} P \\ \dot{P} \end{bmatrix} + \begin{bmatrix} 0 \\ M_{XO}^{-1} \end{bmatrix}(u+d) \quad \text{(Formula 16)}$$

$$X=[P\dot{P}]^T \in R^{2\alpha \times 1}$$

As for an output equation, an output y is different between the case of the position control and the case of the force control, and further even under the force control it is different between the case in which the resisting force is to be controlled and the case in which the friction is to be controlled, but the following formula 17 stands.
(Formula 17)

$$y \in R^{n \times 1} \quad \text{(Formula 17)}$$

The output y can be obtained as being expressed by the formula 18 in the case of the position/position control.

$$y=[I_n O_n] X \quad \text{(Formula 18)}$$

In the case of the position/force control, it can be obtained as being expressed by the formula 19.

$$y = \begin{bmatrix} y_f \\ y_p \end{bmatrix} = \begin{bmatrix} S_f F \\ S_p P \end{bmatrix} = \begin{bmatrix} S_f K & O_{(n-p)\times n} \\ S_p & O_{p\times n} \end{bmatrix} \cdot X \quad \text{(Formula 19)}$$

$$y_f \in R^{(n-p)\times 1}, y_p \in R^{p\times 1}, S_f \in R^{(n-p)\times n}, S_p \in R^{p\times n}$$

Here, $y_f$ is a force-monitoring component vector, $y_p$ is a position-monitoring component vector, and $S_f$ and $S_p$ are matrixes which are selected in conformity with the intended use so that elements in y are independent from one another. For instance, a suitable $S_f$ is selected corresponding to the resisting-force control and the friction control.

Next, an example of a process of designing a control system for a multi-joint robot will be described.

This multi-joint robot adopts a sliding mode decoupling control. Therefore, first of all, a sliding mode decoupling control system will be described (T. Mita, T. Suzuki and A. Shimada, Robust Decoupling Control Via Sliding Mode Control, 1996 IEEE Workshop on Variable Structure Systems, pp. 20–25, and Mita, Suzuki and Shimada, VSS Decoupling Control and Role of Zero Point, Electric Association Industrial Measurement Control Study Team IIC-97-26, Mar. 17, 1997 are available as references for the sliding mode decoupling control system).

The object to be controlled is expressed by the formula 20.

$$\dot{x}(t)=Ax(t)+Bu(t)+Bd(x,t), y=Cx(t) \quad \text{(Formula 20)}$$

Note that it is assumed that the A(n×n), B(n×m), C(m×n) and d(x,t) under a condition of non-linear disturbance the magnitude of which is known does satisfy the formula 21, does not satisfy $\det(CB)\ne 0$, and does satisfy the formula 22.

$$\|d(x,t)\| \leq L(x,t) \quad \text{(Formula 21)}$$

$$c_i B=0, \ldots, c_i A^{P_i-2} B=0, c_i A^{P_i-1} B \ne 0 \quad \text{(Formula 22)}$$

Here, $c_i$ means i-tl column of the C matrix. As well-known, if the formula 23 is nonsingular, then the decoupling can be achieved.

$$B^* = \begin{bmatrix} C_1 A^{p_1-1} B \\ \ldots \\ C_m A^{p_m-1} B \end{bmatrix} \quad \text{(Formula 23)}$$

Next, using the C matrix and a differentiable target value r(t), the coefficient matrix formula 24 is defined, and a hyper-plane σ(t) is designed. In this case, the formula 25 stands.

$$\tilde{c}, \tilde{r}(t) \quad \text{(Formula 24)}$$

$$\tilde{c}B=B^* \quad \text{(Formula 25)}$$

The formulae 26 to 28 are defined.

$$\tilde{C}=[\tilde{c}_1, \ldots, \tilde{c}_m]^T$$

$$\tilde{c}_i = a_1{}^i c_i + a_2{}^i c_i A + \ldots + a_{p_i-1}{}^i c_i A^{p-2} + c_i A^{p-1} \quad \text{(Formula 26)}$$

$$\tilde{r}(t)=[\tilde{r}_1(t), \ldots, \tilde{r}_m(t)]^T$$

$$\tilde{r}_i(t)=a_1{}^i r_i + a_2{}^i r_i^{(1)} + \ldots + a_{p_i-1}{}^i r_i^{(p_i-2)} + r^{(p_i-1)} \quad \text{(Formula 27)}$$

$$\sigma(t)=\tilde{C}x(t)-\tilde{r}(t) \quad \text{(Formula 28)}$$

Note that if the output and its first-stage to $(P_i-1)$-th stage differential values can be monitored, then the formula 29 can be defined, and the hyper-plane σ(t) can be obtained as being expressed by the formulae 30 and 31 in place of the formula 28.

$$\tilde{y}(t) \quad \text{(Formula 29)}$$

$$\tilde{y}(t)=[\tilde{y}_1(t), \ldots, \tilde{y}_m(t)]$$

$$\tilde{y}_i(t)=a_1{}^i y_i + a_2{}^i y_i^{(1)} + \ldots + a_{p_i-1}{}^i y_i^{(p_i-2)} + y^{(p_i-1)} \quad \text{(Formula 30)}$$

$$\sigma(t)=\tilde{y}(t)-\tilde{r}(t) \quad \text{(Formula 31)}$$

In this case, as for the control input, the formulae 32 and 33 are used.

$$u=-(\tilde{C}B)^{-1}\tilde{C}Ax+(\tilde{C}B)^{-1}\bar{u}+(\tilde{C}B)^{-1}\tilde{r}=-B^{*-1}\tilde{C}Ax+B^{*-1}\bar{u}+B^{*-1}\tilde{r} \quad \text{(Formula 32)}$$

$$\bar{u} = -\begin{bmatrix} k_1(x,t)\text{sgn}(\sigma_1) \\ \ldots \\ k_m(x,t)\text{sgn}(\sigma_m) \end{bmatrix} \quad \text{(Formula 33)}$$

Using the formula 34 to define candidates of Lyapunov function in each row, the formula 35 are obtained.

$$V_i(t)=\sigma_i^2(t)/2 \geq 0 \quad \text{(Formula 34)}$$

$$V(t) \quad \text{(Formula 35)}$$

Using the formula 36, if the $k_i(x, t)$ is selected as being expressed by the formula 37, then $V_i(t)$ becomes a Lyapunov function, and the formula 38 is obtained. The right upper (k) means k-th differential.

$$\dot{V}_i=\sigma_i(-k_i \text{ sgn}(\sigma_i)+\tilde{c}_i Bd)=|\sigma_i|(--k_i \pm \tilde{c}_i Bd) \quad \text{(Formula 36)}$$

$$k_i(x,t) > \|\tilde{c}_i B\| L(x,t) \quad \text{(Formula 37)}$$

$$\sigma_i^{(k)} \to 0, k \geq 0 \quad \text{(Formula 38)}$$

A necessary and sufficient condition for the stable equivalent linear system when the formula 39 stands is that a invariant zero point in the formula 40 is stable. This condition is equivalent to the case in which in each of the formulae 41 to 43 the equation $h_i(s)=0$ (i=1 to m) is the stable multinomial and invariant zero point of (C, A, B) is stable.

$$V_i(t)=\sigma_i^2(t)/2 \geq 0 \qquad \text{(Formula 39)}$$

$$(\tilde{C},A,B) \qquad \text{(Formula 40)}$$

$$\det\begin{bmatrix} A-sI & B \\ \tilde{C} & 0 \end{bmatrix} = \det H(s) \det\begin{bmatrix} A-sI & B \\ C & 0 \end{bmatrix} \qquad \text{(Formula 41)}$$

$$H(s)=\text{diah}(h_1(s), h_2(s), \ldots, h_m(s)) \qquad \text{Formula 42}$$

$$h_i=a_1^i+a_2^is+\ldots+a_{p_i-1}^i s^{p_i-2}+s^{p_i-1} \qquad \text{(Formula 43)}$$

Note that since the formula 44 does not have the zero point, it is sufficient that the $h_i(s)=0$ (i=1 to m) is selected to be the stable multinomial.

$$n=\Sigma_{i=1}^m p_i \qquad \text{(Formula 44)}$$

Next, the adaptation to the case in which the C matrix has an uncertainty.

Consideration is given to the case in which the C matrix has such an uncertainty as to be expressed by $c_i=c_{0i}+\delta_i$ i $C_{0i}$, $\delta_{i,min} \leq \delta_i \leq \delta_{i,max}$, $|\delta_i|<1$, but the output y can be monitored directly. The $\delta$ value of the hyper-plane formula 28 can be obtained accurately, but the formula 46 or the formula 47 corresponding to the $c_{0i}$ is required to be used as the formula 45 in the control input formula 32. Then, the $k_i(x, t)$ of the formula 37 must be corrected similarly to the formula 48 so that the V becomes the Lyapunov function.

$$\tilde{c} \qquad \text{(Formula 45)}$$

$$\tilde{c}_0 \qquad \text{(Formula 46)}$$

$$\tilde{B}_0 \qquad \text{(Formula 47)}$$

$$k_i(x, t) > |\tilde{c}_{0i}B\|L(x, t)+(1+\delta_{i,min})^{-1}\delta_{i,max}|\dot{r}| \qquad \text{(Formula 48)}$$

Next, the force control for the two-joint robot, to which the above-described control process is actually applied, will be described.

Figure 6:
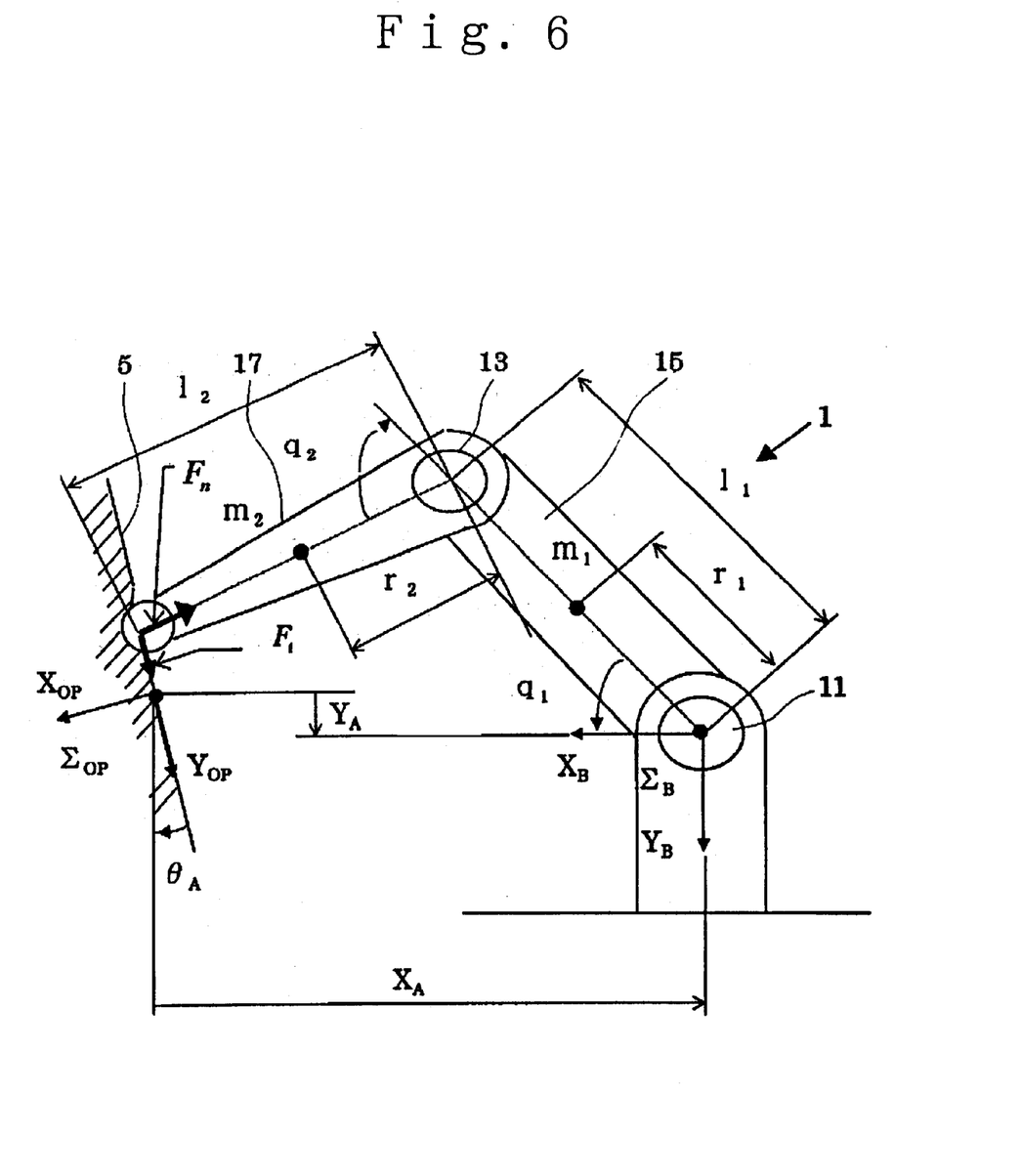
FIG. 6 shows an entire construction of a two-joint robot.

FIG. 6 shows the entire construction of this two-joint robot.

In FIG. 6, a vertical two-joint manipulator 1 moves the workpiece 3 so as to approach a grinding belt (a grindstone, a buff or the like) running in the same one direction (the approach motion). Thereafter, the groping motion is carried out under the position/position control or the position/resisting-force control until the workpiece 3 is completely contacted with the grinding surface 5. It is designed that the grinding operation is practiced under the position/resisting-force control or the position/friction control.

Although the manipulator 1 is described as having a two-joint construction for simplifying the explanation, the application of the present invention should not be restricted to the two-joint construction.

It is defined that a mass of a first link 15 of the vertical two-joint manipulator 1 is $m_1$, a mass of a second link 17 thereof is $m_2$, a length from a first axis 11 to a second axis 13 is $l_2$, a length from the second axis 13 to the grinding surface 5 is $l_2$, a length from the first axis 11 to a center of gravity of the first link 15 is $r_1$, and a length from the second axis 13 to a center of gravity of the second link 17 is $r_2$. A base coordinate system of the vertical two-joint manipulator 1 is defined as $\Sigma_B$, an operation coordinate system is defined as $\Sigma_{OP}$ the original point coordinate value of the $\Sigma_B$ in the $\Sigma_{OP}$ is defined as $(X_A, Y_A)$ and a Z axial rotational angle of $\Sigma_B$ of the $\Sigma_{OP}$ is defined as $\theta_A$. The friction on the workpiece 3 is defined as $F_r$.

It is further defined that the force F is comprised of the resisting force $F_n$ and the friction $F_r$ on the grinding surface 5, and can be monitored using a force sensor.

$$F==[f_n\ f_t]^T \qquad \text{(Formula 49)}$$

The workpiece coordinate value P in the operation coordinate system $\Sigma_{OP}$ is defined.

$$P=[p_x\ p_y]^T \qquad \text{(Formula 50)}$$

If the elastic coefficient and the friction coefficient of the grinding surface are defined as k ($=k_0+\Delta k$) and $\alpha$ ($=\alpha_0+\Delta\alpha$), respectively, then the coefficient matrix K is expressed by the formula 51.

$$K = \begin{bmatrix} k & 0 \\ \alpha \cdot k & 0 \end{bmatrix} \qquad \text{(Formula 51)}$$

$$= \begin{bmatrix} k_0 & 0 \\ \alpha_0 \cdot k_0 & 0 \end{bmatrix} + \begin{bmatrix} \Delta k & 0 \\ \alpha_0 \cdot \Delta k + \Delta\alpha \cdot k_0 + \Delta\alpha \cdot \Delta k & 0 \end{bmatrix}$$

Although the $M_X$ and $h_{X0}$ are functions of q, the following description is directed to the case in which the A and B matrixes are obtained for such a operation that the workpiece is positioned near the original point of the $\Sigma_{OP}$. The $M_{X0}$ in this case is expressed by the formula 52.

$$M_{X0} = \begin{bmatrix} M_{X0\_11} & M_{X0\_12} \\ M_{X0\_21} & M_{X0\_22} \end{bmatrix} \qquad \text{(Formula 52)}$$

Note that the formula 53 stands.

$$|M_{X0}| \neq 0 \qquad \text{(Formula 53)}$$

From the formulae 16 and 52, the A and B matrixes are expressed by the formulae 54 and 55, respectively.

$$A = \begin{bmatrix} 0 & 0 & 1 & 0 \\ 0 & 0 & 0 & 1 \\ \dfrac{-k_0 M_{X0\_22} + \alpha_0 k_0 M_{X0\_12}}{|M_{X0}|} & 0 & 0 & 0 \\ \dfrac{-k_0 M_{X0\_21} + \alpha_0 k_0 M_{X0\_11}}{|M_{X0}|} & 0 & 0 & 0 \end{bmatrix} \qquad \text{(Formula 54)}$$

$$B = \begin{bmatrix} 0 & 0 \\ 0 & 0 \\ \dfrac{M_{X0\_22}}{|M_{X0}|} & -\dfrac{M_{X0\_12}}{|M_{X0}|} \\ -\dfrac{M_{X0\_21}}{|M_{X0}|} & \dfrac{M_{X0\_11}}{|M_{X0}|} \end{bmatrix} \qquad \text{(Formula 55)}$$

The amount to be controlled depends on the control mode, and in the case of the position/position control it is expressed by the formula 56.

$$y = \begin{bmatrix} P_x \\ P_y \end{bmatrix} = \begin{bmatrix} 1 & 0 & 0 & 0 \\ 0 & 1 & 0 & 0 \end{bmatrix} \cdot \begin{bmatrix} P \\ \dot{P} \end{bmatrix} \quad \text{(Formula 56)}$$

In the case of the position/resisting-force control, it is expressed by the followings.

If the depression in the normal direction and the positioning in the tangential direction are considered as the object to be controlled, the formula 58 is obtained using the formula 19 through the formula 57.

$$S_f = [1\ 0],\ S_p = [0\ 1] \quad \text{(Formula 57)}$$

$$y = \begin{bmatrix} f_n \\ P_y \end{bmatrix} = \begin{bmatrix} [0\ 1]\begin{bmatrix} k & 0 \\ \alpha \cdot k & 0 \end{bmatrix} & 0\ 0 \\ [0\ 1] & 0\ 0 \end{bmatrix} \cdot \quad \text{(Formula 58)}$$

$$X = \begin{bmatrix} k & 0 & 0 & 0 \\ 0 & 1 & 0 & 0 \end{bmatrix} \cdot X$$

Next, in the case of the position/friction control, the amount to be controlled is expressed as follows.

If the positioning in the tangential direction while carrying out the friction control in the same direction is considered as the object to be controlled, the formula 60 is obtained using the formula 19 through the formula 60.

$$S_f = [1\ 0],\ S_p = [0\ 1] \quad \text{(Formula 59)}$$

$$y = \begin{bmatrix} f_t \\ P_y \end{bmatrix} = \begin{bmatrix} [0\ 1]\begin{bmatrix} k & 0 \\ \alpha \cdot k & 0 \end{bmatrix} & 0\ 0 \\ [0\ 1] & 0\ 0 \end{bmatrix} \cdot \quad \text{(Formula 60)}$$

$$X = \begin{bmatrix} \alpha \cdot k & 0 & 0 & 0 \\ 0 & 1 & 0 & 0 \end{bmatrix} \cdot X$$

The control system design with respect to the formulae 56, 58 and 60 can be unified as being expressed by the formula 61 if the component in the first column and the first row in the right side coefficient matrix is temporally designed as the $c_{11}$ and finally returned to the original variable in accordance with each mode.

$$y = C \cdot x = \begin{bmatrix} c_{11} & 0 & 0 & 0 \\ 0 & 1 & 0 & 0 \end{bmatrix} \cdot x$$

$$c_{11} = \begin{cases} 1 & \text{for position/position control} \\ k & \text{for position/resisting force control} \\ \alpha \cdot k & \text{for position/friction control} \end{cases} \quad \text{(Formula 61)}$$

Note that, in the case where nominal values $\alpha_0$ and $k_0$ of variables are used, the coefficient matrix and the element variable are denoted by $C_0$ and $C_{011}$, respectively.

From the above-noted matrixes A, B and C, the control system is designed so that each control corresponds to the intended object. From the formulae 55 and 61, the formulae 62 and 63 are obtained.

$$CB = \begin{bmatrix} c_{11} & 0 & 0 & 0 \\ 0 & 1 & 0 & 0 \end{bmatrix} \begin{bmatrix} 0 & 0 \\ 0 & 0 \\ * & * \\ * & * \end{bmatrix} = \begin{bmatrix} 0 & 0 \\ 0 & 0 \end{bmatrix} \quad \text{(Formula 62)}$$

$$\det(CB) = 0 \quad \text{(Formula 63)}$$

Next, using the nominal parameter of the C matrix, the formula 64 stands.

$$c_{01} AB = \begin{bmatrix} c_{11} \cdot \frac{M_{X0\_22}}{|M_{X0}|} & -c_{11} \cdot \frac{M_{X0\_12}}{|M_{X0}|} \end{bmatrix} \neq [0\ 0] \quad \text{(Formula 64)}$$

$$c_{02} AB = \begin{bmatrix} -\frac{M_{X0\_21}}{|M_{X0}|} & \frac{M_{X0\_11}}{|M_{X0}|} \end{bmatrix} \neq [0\ 0]$$

Note that the formula 65 also stands.

$$n = \Sigma_{i=1}{}^n p_i = 2 + 2 = 4 \quad \text{(Formula 65)}$$

The incoherent matrixes are expressed by the formulae 66 and 67.

$$B_0^* = \begin{bmatrix} C_{01} AB \\ C_{02} AB \end{bmatrix} = \begin{bmatrix} c_{11} \cdot \frac{M_{X0\_22}}{|M_{X0}|} & -c_{11} \cdot \frac{M_{X0\_12}}{|M_{X0}|} \\ -\frac{M_{X0\_21}}{|M_{X0}|} & \frac{M_{X0\_11}}{|M_{X0}|} \end{bmatrix} \quad \text{(Formula 66)}$$

$$B_0^{*-1} = \begin{bmatrix} M_{X0\_11}/c_{11} & M_{X0\_12} \\ M_{X0\_21}/c_{11} & M_{X0\_22} \end{bmatrix} \quad \text{(Formula 67)}$$

Note that the formula 68 is made nonsingular.

$$B^*{}_0 \quad \text{(Formula 68)}$$

From the formula 26, the formula 69 is introduced into the formula 70.

$$\overline{C}_0 \quad \text{(Formula 69)}$$

$$\overline{C}_0 = \begin{bmatrix} \overline{c}_{01} \\ \overline{c}_{02} \end{bmatrix} = \begin{bmatrix} a_1^1 c_{01} + c_{01} A \\ a_1^2 c_{02} + c_{02} A \end{bmatrix} = \begin{bmatrix} a_1^1 c_{011} & 0 & c_{011} & 0 \\ 0 & a_1^2 & 0 & 1 \end{bmatrix} \quad \text{(Formula 70)}$$

On the other hand, it is necessary to provide the reference value r(t) as a variable related to the control mode to correspond to the output.

$$r = \begin{bmatrix} r_1 \\ r_2 \end{bmatrix} = \quad \text{(Formula 71)}$$

$$\begin{cases} [P_{rx}\ P_{ry}]^T & \text{for position/position control} \\ [f_{rn}\ P_{ry}]^T & \text{for position/resisting force control} \\ [f_{rt}\ P_{ry}]^T & \text{for position/friction control} \end{cases}$$

Each element in the following formula 72 is determined in accordance with the formula 71.

$$\tilde{r} = \begin{bmatrix} \tilde{r}_1 \\ \tilde{r}_2 \end{bmatrix} = [a_1^1 r_1 + \dot{r}_1\ \ a_1^2 r_2 + \dot{r}_2]^T \quad \text{(Formula 72)}$$

Note that if the monitoring output and the first-stage time-differential value of the reference value are used directly, then the switching function σ(t) indicative of the hyper-plane is obtained as being expressed by the formula 73 correspondingly to each control mode of the formula 71 even if an uncertain element exists in the C matrix.

$$\sigma(t) = \begin{cases} \begin{bmatrix} a_1^1(P_x - P_{rx}) + (\dot{P}_x - \dot{P}_{rx}) \\ a_1^2(P_y - P_{ry}) + (\dot{P}_y - \dot{P}_{ry}) \end{bmatrix} & \text{(73A)} \\ \begin{bmatrix} a_1^1(f_n - f_m) + (\dot{f}_n - \dot{f}_m) \\ a_1^2(P_y - P_{ry}) + (\dot{P}_y - \dot{P}_{ry}) \end{bmatrix} & \text{(73B)} \\ \begin{bmatrix} a_1^1(f_t - f_{rt}) + (\dot{f}_t - \dot{f}_{rt}) \\ a_1^2(P_y - P_{ry}) + (\dot{P}_y - \dot{P}_{ry}) \end{bmatrix} & \text{(73C)} \end{cases}$$
(Formula 73)

The non-linear input gain $k_i$ (x, t) is expressed by the formula 74 from the formula 48, and the final joint driving torque τ of the manipulator 1 is expressed by the formula 75.

$$k_i(x, t) > \|\tilde{c}_{0i} B\| L(x, t) + (1 + \delta_{i,min})^{-1} \delta_{i,max}|$$

$$|\dot{\tilde{r}}|$$ (Formula 74)

$$\tau = J_r^T \bar{u} = J_r^T \cdot (u + h_{X0}(q, \dot{q})) = J_r^T \cdot (-B^{*-1}$$

$$\check{C} A X + B^{*-1_0 + B}{}_0 \cdot {}^{-1} \ddot{r} + h_{X0}(q, \dot{q}))$$ (Formula 75)

$$\tilde{u} = -\begin{bmatrix} k_1 & \text{sgn}(\sigma_1) \\ k_2 & \text{sgn}(\sigma_2) \end{bmatrix}$$ (Formula 75)

Figure 7:
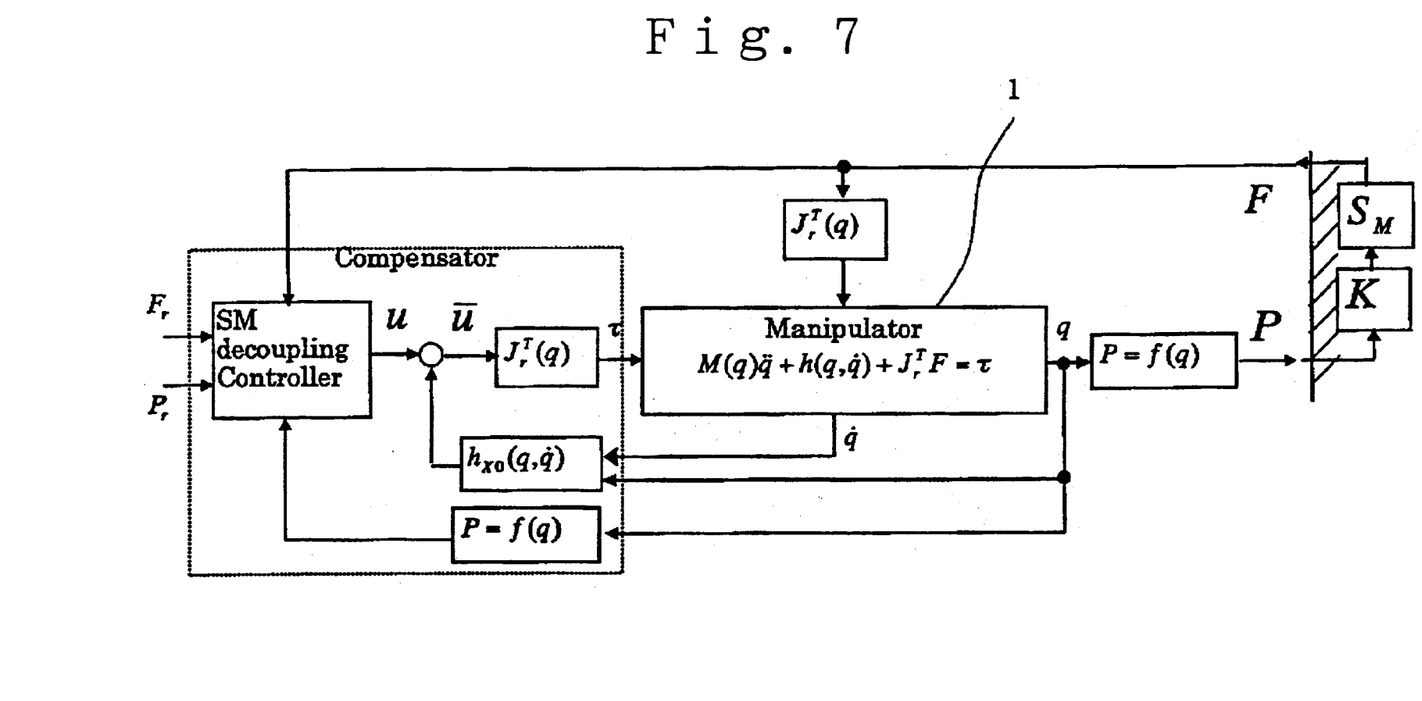
FIG. 7 is a block diagram of a control system.
Figure 8:
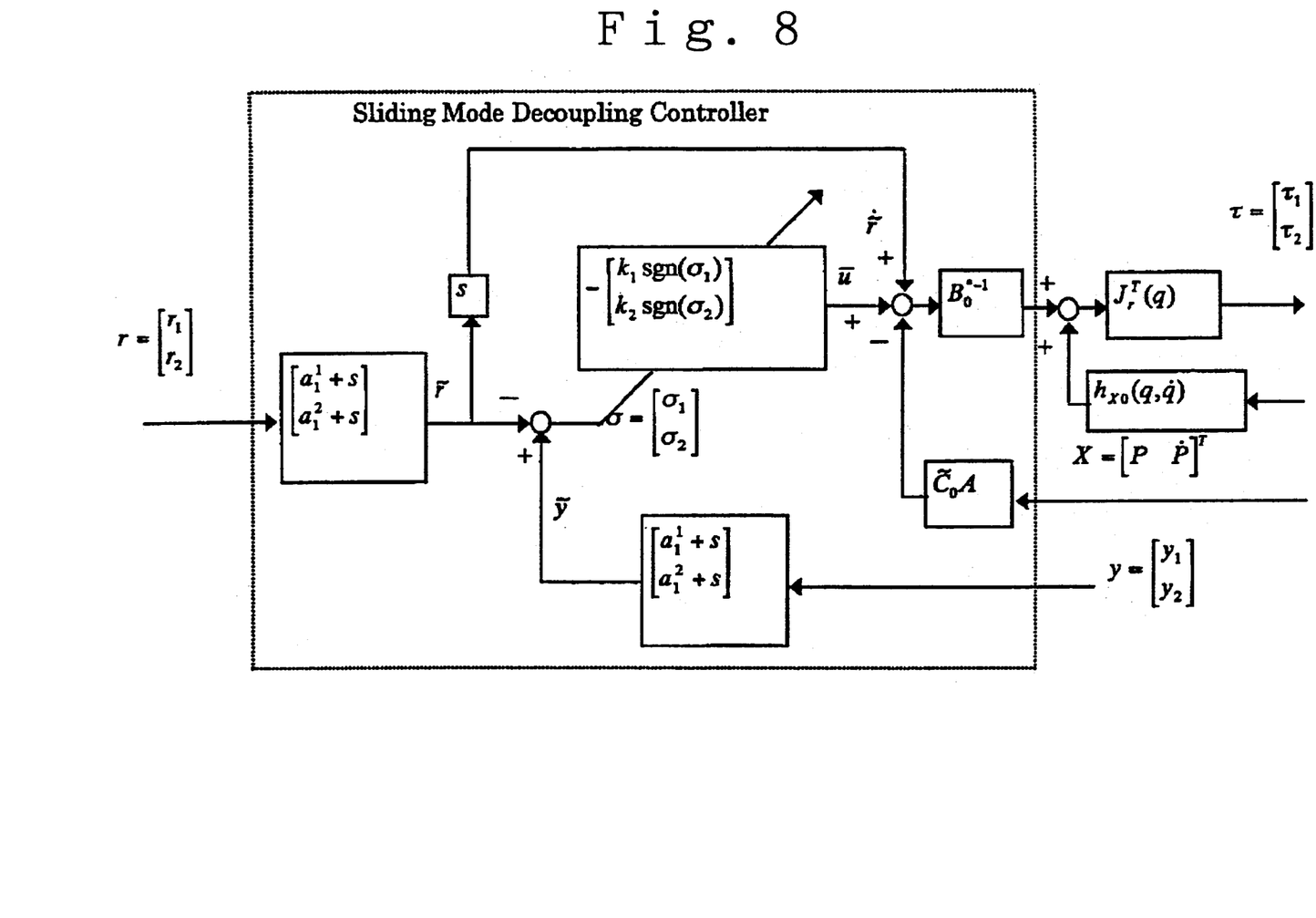
FIG. 8 is a detailed block diagram showing a compensator portion shown in FIG. 7 for carrying out sliding mode decoupling control.

FIG. 7 is a block diagram for the control system corresponding to the above description. FIG. 8 shows, in detail, a compensator portion for carrying out the sliding mode control which is shown in FIG. 7. In FIG. 8, the formula 76 is required to be switched appropriately in association with the control mode transition.

$$r, y, B_0{}^{-1}, \tilde{C}_0, k_1, k_2$$ (Formula 76)

Figure 9:
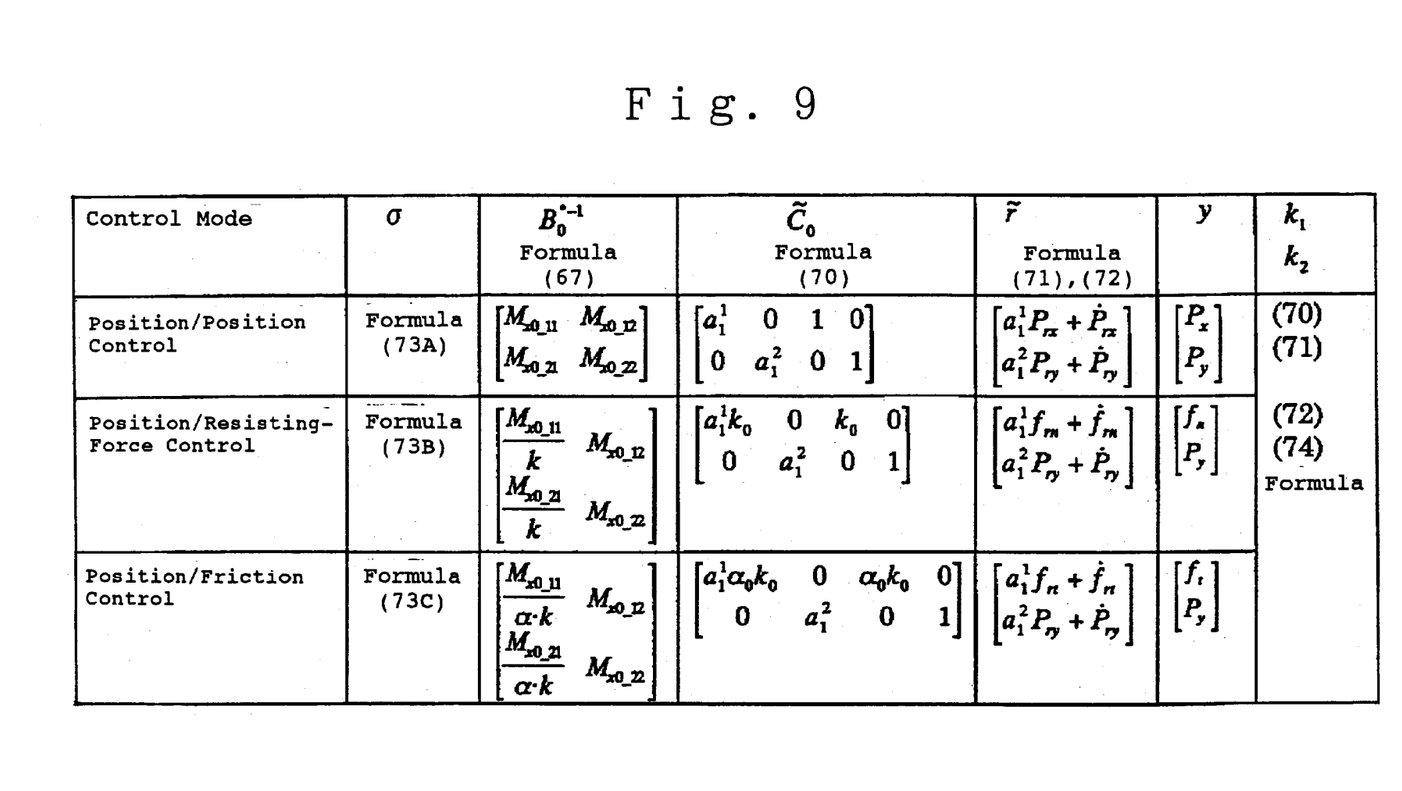
FIG. 9 shows control variables corresponding to the respective modes.

A table in FIG. 9 collectively shows corresponding variables to respective modes. That is, the values of variables shown in the table are switched for use during the actual control.

As described above, the sliding mode decoupling control method and the control system for the same are applied to the force control of the robot under the condition that the elastic coefficiency and the friction coefficiency of the contact surface 5 is varied. These are further extended so as to cope with the mode switching and the state transition associated therewith. Therefore, the smooth mode switching between the position control of the robot within the free space and the force/position control toward the contact surface 5 is made possible, so that even if the contact surface 5 has an unknown geometric error, the smooth mode switching can be achieved without the damage of the contact object and the workpiece 3 and the out-of-control of the robot.

Accordingly, the application of the present control method to the grinding process, the cutting process, or other works such as a peg-in-hole inserting a shaft into a hole makes it possible to realize the processing or assembling with high quality.

In addition, since the present control method is constructed on the basis of the operation conversion system, the present control method is usable not only for a serially connected conventional robot but also for a parallel connected robot manipulator and the like.

As described above, according to the present invention, the smooth mode switching for the robot between the position control in the free space and the force or position control to the contact surface can be achieved using the approach motion means, the groping motion means, the contact motion means and the leaving motion means. Further, the preliminarily setting of the estimated contact surface makes it possible to carry out the mode control without the damage of the contact object and the workpiece and the out-of-control of the robot even if the contact surface has an unknown geometric error.

What is claimed is:

1. A robot controller used for a processing work or an assembling work, which has a control system mode switching function, said robot controller comprising:

approach motion means for preliminary setting an estimated contact surface which is the closest surface where a contact surface defining a restricted space and having a geometric error is expected to exist, and moving a workpiece or a predetermined portion of a processing or assembling machine to approach said estimated contact surface under a position control in the direction of at least two degrees of freedom;

groping motion means for moving said workpiece or said predetermined portion of said processing or assembling machine under a position control in the direction of at least two degrees of freedom to approach an actual contact surface from said estimated surface reaching by said approach motion means at a preliminarily set approach speed equal to or less than a maximum collision speed;

contact motion means for simultaneously carrying out a position control in the direction of at least one degree of freedom and a friction control in the direction of the same degree of freedom with respect to said contact surface reaching by the groping motion means; and leaving motion means for moving said workpiece on which at least a processing has been made by the contact motion means or said predetermined portion of said processing or assembling machine by which at least the processing has been made by the contact motion means to leave to a predetermined position under a position control in the direction of at least two degrees of freedom.

2. A robot controller having a control system mode switching function according to claim 1, wherein said groping motion means carries out a position control in the direction of at least one degree of freedom from said estimated contact surface reaching by said approach motion means to said actual contact surface, carries out a resisting-force control in the direction of another degree of freedom with respect to said contact surface, and transits to said contact motion means when a detected resisting force or frictional force is equal to or more than a preliminarily set threshold value.

3. A robot controller having a control system mode switching function according to claim 1 or 2, wherein said contact motion means simultaneously carries out a position control in the direction of at least one degree of freedom with respect to said contact surface reaching by said groping motion means, and a control of a resisting force belonging to the direction of another degree of freedom with respect to said contact surface.

4. A robot controller having a control system mode switching function according to any one of claims 1 to 3, wherein said robot controller has a sliding mode decoupling function designed correspondingly to variations in elasticity or friction coefficient of a contact object, and control modes for said position control in said direction of at least two degree of freedom, said position control in said direction of one degree of freedom and said friction control in the direction of the same degree of freedom, said position control in said direction of one degree of freedom and said control of said resisting force belonging to said direction of another degree of freedom with respect to said contact surface are respectively provided with control elements or compensators preliminarily designed for respective modes, so that said control elements or said compensators are selectable in association with switching from one to another among said approach motion means, said groping motion means, said contact motion means and said leaving motion means.

* * * * *